United States Patent Office 3,418,375
Patented Dec. 24, 1968

3,418,375
PREPARATION OF TRIMETHYL-
HEXAMETHYLENEDIAMINE
Karl Schmitt, Herne, Josef Disteldorf, Wanne-Eickel, and Werner Hübel, Herne, Germany, assignors to Scholven-Chemie Aktiengesellschaft, Gelsenkirchen-Buer, Germany
No Drawing. Filed Nov. 19, 1965, Ser. No. 508,839
Claims priority, application Germany, Nov. 26, 1964,
Sch 36,168
12 Claims. (Cl. 260—583)

ABSTRACT OF THE DISCLOSURE

Process for hydrogenating 2,2,4- and/or 2,4,4-trimethyl adipic acid dinitrile to form the corresponding diamines comprising reacting said dinitrile with liquid ammonia and hydrogen in the presence of a nickel or cobalt catalyst supported on a carrier containing aluminum oxide at a temperature of from about 60 to 160° C. under conditions of throughput, dinitrile:ammonia ratio, quantity of hydrogen and pressure such as to produce in the first fifth of the reaction zone at least a 75% conversion of the dinitrile, and in the remainder of the reaction zone to produce only a post-hydrogenation.

This invention relates to the preparation of trimethylhexamethylenediamine and more particularly relates to a method for preparing 2,2,4- and/or 2,4,4-trimethylhexamethylenediamine by catalytic hydrogenation of 2,2,4- and/or 2,4,4-trimethyl adipic acid dinitrile.

It has been known for some time that adipic acid dinitrile could be converted into hexamethylenediamine by catalytic hydrogenation thereof. The hydrogenation catalysts which have proved most satisfactory in this reaction are those which are based on nickel and cobalt and which are used in batch processes in the form of skeleton catalysts and in continuous processes supplied on supports such as, for instance, pumice or silica gel, or in the absence of supports as melt catalysts. The reaction temperatures as employed in the known hydrogenation range from 50 to 150° C., the reaction being carried out under hydrogen pressures of between 20 and 600 atmospheres. In batch operations, ammonia is added in a quantity of up to 50% of the batch and, in continuous operations, as much as four parts of ammonia are added per one part of adipic acid dinitrile, in order to suppress the formation of hexamethylene imine. Using cobalt as catalyst but without the addition of ammonia, diamine yields amounting only up to 89% are achieved. To improve the yields of diamine, it has been suggested to use, in addition to the ammonia, another solvent, such as for instance a lower aliphatic alcohol or a hydrocarbon, or, alternatively, to recirculate a portion of the reaction product.

The removal of the considerable amount of reaction heat ($\Delta H$=approximately 75 kcal.) is carried out in the continuous process by passing a large excess of hydrogen into and through the reactor, cooling the withdrawn hydrogen and recirculating the same in the conventional manner.

When the aforesaid conditions, which are considered optimum for the hydrogenation of adipic acid dinitrile, are applied to the hydrogenation of 2,2,4- and/or 2,4,4-trimethyl adipic acid dinitrile, the corresponding trimethylhexamethylenediamines are obtained only in small yields along with relatively large amounts of secondary and tertiary amines, particularly cyclic, trimethylhexamethylene imine, as well as of 5-aminomethyl-2,2,4- (or 2,4,4-) trimethylcyclopentylamine-(1), the latter constituting an undesirable impurity in most technical applications of the trimethylhexamethylenediamines and further constituting an impurity which is most difficult to separate from the diamine. (See in this regard U.S. patent applications, Ser. Nos. 343,458, 343,807, and 343,808 issued as U.S. Patents 3,297,736, 3,297,740 and 3,297,741, respectively on January 10, 1967.) When the batch hydrogenation of adipic acid dinitrile, using Raney nickel as catalyst, is carried out in the presence of ammonia at 120° C., the hexamethylenediamine is obtained in a yield of over 90%. However, hydrogenation of trimethyl adipic acid dinitrile under the same conditions results only in a 15% yield of the corresponding diamine.

The difference in results is to be attributed to the difference in behavior of the straight chained adipic acid dinitrile as compared to the highly branched nature of the trimethyl adipic acid dinitrile. From the numerous instances disclosed in the technical literature, it can be appreciated that in this instance, as in general, cyclization reactions of open-chained molecules are favored by the presence of substituents. This tendency becomes particularly apparent in the case of trimethyl-substituted adipic acid dinitriles, the arrangement of the methyl group in the molecule in this instance also being important.

Up until the present, no process capable of industrial application has been made available for the manufacture of 2,2,4- and/or 2,4,4-trimethylhexamethylenediamine by the catalytic hydrogenation of the corresponding dinitriles.

It is an object of the present invention to provide an improved method for the preparation of 2,2,4- and/or 2,4,4-trimethylhexamethylenediamine.

It is another object of the invention to provide an improved method for the preparation of 2,2,4- and/or 2,4,4-trimethylhexamethylenediamine by the catalytic hydrogenation of the corresponding dinitriles.

Other objects will become apparent throughout the following specification and claims.

In accordance with the invention it has now been found that 2,2,4- and/or 2,4,4-trimethylhexamethylenediamine may be prepared in yields in excess of 95% by hydrogenating 2,2,4- and/or 2,4,4-trimethyl adipic acid dinitrile at a temperature within the range of about 60 and 160° C. and preferably between 80 and 130° C. while controlling the reaction conditions, i.e., throughput, dinitrile:ammonia ratio, quantity of hydrogen and pressure, to produce in the first fifth of the reaction zone a conversion of more than 75%, and preferably more than 90% of the dinitrile to the diamine, and in the remainder of the reaction zone to produce only a post-hydrogenation. Additionally, the reaction conditions are so regulated that temperature peaks do not occur on the surface of the catalyst. Such a process demands special requirements of the catalyst and the manner of regulating heat output.

In contrast to the conventional nitrile hydrogenation processes, in the process of the invention most of the reaction heat is carried off, not by the hydrogen, but by the ammonia. For this purpose, quantities between 2 and 30, especially 4 and 20 parts by volume of liquid ammonia are required per part of dinitrile. The amount of hydrogen, and also of the ammonia evaporated in the reaction must be kept as small as possible, so that a great excess of ammonia will always be left in the liquid phase. At the same time it is apparant that the maximum permissible amount of hydrogen depends upon the other reaction conditions, such as temperature, pressure, and the originally charged ammonia:dinitrile ratio. For example, if the hydrogenation is performed at 120° C. at a total pressure of 300 atmospheres, the rate of hydrogen throughout must not exceed 5 working liters per kg. of dinitrile at an ammonia-to-dinitrile ratio of 10:1, in order to obtain maximum yields. The pressure should generally be between 100 and 1,000 atmospheres.

Fixed bed catalysts on a kieselguhr support are used, which contain 15–80% by weight, preferably 40–70% by weight, referring to the total weight of catalyst, including aluminum oxide of metallic cobalt or nickel etc. in fine dispersion, eventually with additions of alkaline earth oxides of 2–30% by weight, referring to the concentration of cobalt or nickel and, preferably of manganic oxide.

In accordance with the invention, the catalyst that has been found to be particularly suitable for use in the hydrogenation is a cobalt catalyst which has, on the one hand, such a high activity that rapid hydrogenation is assured in the upper part of the catalyst zone, but which on the other hand has an adequate mechanical stability, i.e., it does not disintegrate and thus become deactivated. These desirable qualities are possessed, for example, by a cobalt catalyst on a kieselguhr support, with additions of alkaline earth oxides, preferably manganic oxide, which catalyst has been reduced in a high-velocity stream of hydrogen at 300 to 500° C., preferably 400 to 450° C. The catalyst most advantageously used in the instant process contains between 25 and 75%, and preferably between 50 and 65% Co in the reduced state.

A decrease of the catalyst's activity in the hydrogenation zone indicates an increase in the formation of cyclic by-products. Trimethyl adipic acid dinitrile per se, as well as its incompletely hydrogenated intermediates (aldimines), have proved especially sensitive to cyclization reactions. In the presence of basic substances, the dinitrile forms 2-imino-trimethylcyclopentane carboxylic acid nitrile, which is then hydrogenated to 5-aminomethyltrimethylcyclopentylamine. A complete hydrogenation, carried out as rapidly as possible, prevents unreacted dinitrile and the basic diamine that has already formed from being co-present in the reaction product for any great length of time, which would necessarily result in the formation of iminonitriles.

The cyclic trimethylhexamethyleneimine probably develops due to the intramolecular addition of nitrile groups which have already been hydrogenated to the amine, to groups that have not been hydrogenated or have been hydrogenated only to the aldimine stage:

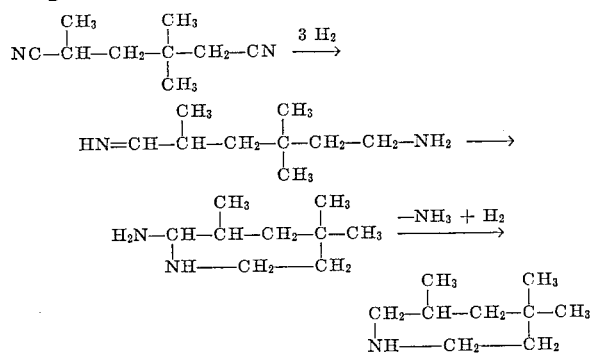

In addition to the generally greater cyclic stability of substituted heterocyclene, its formation is in this case considerably promoted by the fact that the nitrile groups are hydrogenated at different speeds because of the asymmetrical arrangement of the methyl groups.

The requirement of the process of the invention, that the hydrogenation be carried out as completely as possible in the uppermost zone of the catalyst, generally limits the maximum permissible throughput of dinitrile. The types of reactors which have proved particularly effective are characterized by an arrangement in which the material being hydrogenated first flows through a section of the reactor having a relatively large cross-section, while the post-hydrogenation is conducted in a section having a comparatively small cross-section. Such reactors have not been commonly used hitherto. By an arrangement such as just set out, the performance of a hydrogenating apparatus can be improved considerably. It is also possible to use two different reactors: the first a wide, short hydrogenating reactor from the bottom of which the product is carried into a second long, narrow reaction tower.

The hydrogenation can be carried out using a temperature range of between 60 and 160° C., preferably between 80 and 130° C. In addition to ammonia, another solvent can be used, such as, for example, methanol. The separation of the ammonia from the crude diamine is expediently performed by pressure distillation (20–50 atmospheres), the distilled ammonia being recycled into the reaction.

The trimethylhexamethylenediamines that are produced in high yields in accordance with the invention are valuable intermediates for the manufacture of plastics and are produced in a form suitable for direct use. The following examples are intended to be illustrative and are not to be construed as a limitation on the invention.

Example I

Ten liters of a cobalt catalyst (60% Co on a kieselguhr support in the form of threads) were placed in a reactor tube having an inside diameter of 120 mm. and a length of 1500 mm. Above and below the catalyst, there was placed a layer of Raschig rings. 1.2 liters trimethyladipic acid dinitrile and 10 liters liquid ammonia were pumped per hour into the upper part of the reactor tube in such a manner that the nitrile and ammonia were completely mixed with one another before they entered into the catalyst zone, and furthermore so that they trickled in uniform distribution through the catalyst chamber. The hydrogenating temperature amounted to 120° C. and was attained in the very first fifth of the reactor. The hydrogen pressure amounted to 300 atmospheres. From the bottom part of the hydrogenating reactor tube the product was flowed into a pressure separator in which hydrogen and ammoniacal diamine solution were separated out. 1.5 Nm.$^3$ of hydrogen were removed hourly from the gas phase of the separator. The liquid product was pressure-relieved to 300 atmospheres, and the ammonia separated by distillation at this pressure and re-used.

The further refinement of the crude diamine was carried out by vacuum distillation. It contained the following fractions:

| | Weight percent |
|---|---|
| Trimethylhexamethyleneimine | 1.8 |
| 5-aminomethyl-trimethyl-cyclopentylamine | 0.08 |
| Trimethylhexamethylenediamine | 96.9 |
| Distillation residue | 1.2 |

Example II

The hydrogenating apparatus employed in the instant example consisted of two superposed reactors, i.e., reaction zones of different dimensions, of which the upper reactor (diam. 500 mm.; length 1,000 mm.) was charged with 130 liters of the catalyst described above, and the lower reactor (diameter 250 mm.; length 2,000 mm.) was charged with 80 liters of the same catalyst. In the upper third of the first reactor there was installed a heat exchanger in which the starting product was preheated and at the same time a part of the reaction heat was removed. The hourly throughput amounted to 35 liters trimethyladipic acid dinitrile, 260 liters NH$_3$ (liquid) and 40 Nm.$^3$ hydrogen. Otherwise, the installation was equipped in the manner described in Example 1. The average yield of pure diamine in the first 2,000 hours of operation amounted to about 95.5%.

We claim:
1. A process of hydrogenating 2,2,4- and/or 2,4,4-trimethyl adipic acid dinitrile to their corresponding diamines, comprising reacting 2,2,4- and/or 2,4,4-trimethyl adipic acid dinitrile with liquid ammonia and hydrogen in the presence of a member selected from the group consisting of nickel and cobalt catalysts supported on a carrier, in fine dispersion, said cobalt or nickel being present in an amount of from 15–80% by weight referred to the total catalyst, at a temperature ranging from about 60 to 160° C. under conditions of throughput, dinitrile:ammonia ratio, quantity of hydrogen and pressure to produce in the first fifth of the reaction zone at least a 75% conversion of the dinitrile to the diamine and in the remainder of the reaction zone to substantially complete the hydrogenation.

2. Process according to claim 1, which comprises effecting said reaction at a temperature of from 80 to 130° C.

3. Process according to claim 1, which comprises effecting said reaction under conditions to produce in the first fifth of the reaction zone at least a 90% conversion of the dinitrile to the diamine.

4. Process according to claim 1 which comprises effecting said reaction at a pressure whereby the ammonia is maintained in liquid phase in an amount of between 2 and 30 parts by volume of liquid ammonia per part by volume of dinitrile in the reaction zone.

5. Process according to claim 1, wherein said reaction is effected at a pressure of between 100 and 1,000 atmospheres.

6. Process according to claim 1, wherein said catalyst is a cobalt catalyst.

7. Process according to claim 1, wherein said catalyst is a cobalt catalyst applied to a solid support.

8. Process according to claim 1, wherein said reaction is effected by reacting said dinitrile, ammonia, and hydrogen in two successively-arranged reaction zones, said first reaction zone having a ratio of diameter to length which is greater than the ratio of diameter to length of the second of said reaction zones.

9. Process according to claim 1 wherein said cobalt or nickel is present in an amount of 40 to 70% by weight referred to the total catalyst.

10. Process according to claim 1 which comprises effecting said reaction at a pressure whereby the ammonia is maintained in liquid phase in an amount of between 4 and 30 parts by volume of liquid ammonia per part by volume of dinitrile in the reaction zone.

11. Process according to claim 1 wherein said catalyst is a cobalt catalyst additionally containing an alkaline earth oxide in an amount of 2–30% by weight, referred to the amount of cobalt.

12. Process according to claim 11 wherein said alkaline earth oxide is manganic oxide.

No references cited.

CHARLES B. PARKER, *Primary Examiner.*

P. C. IVES, *Assistant Examiner.*

U.S. Cl. X.R.

260—464, 563, 690